No. 886,325. PATENTED APR. 28, 1908.
E. F. OSBORNE.
HEATING AND VENTILATING APPARATUS.
APPLICATION FILED FEB. 23, 1904.
5 SHEETS—SHEET 2.
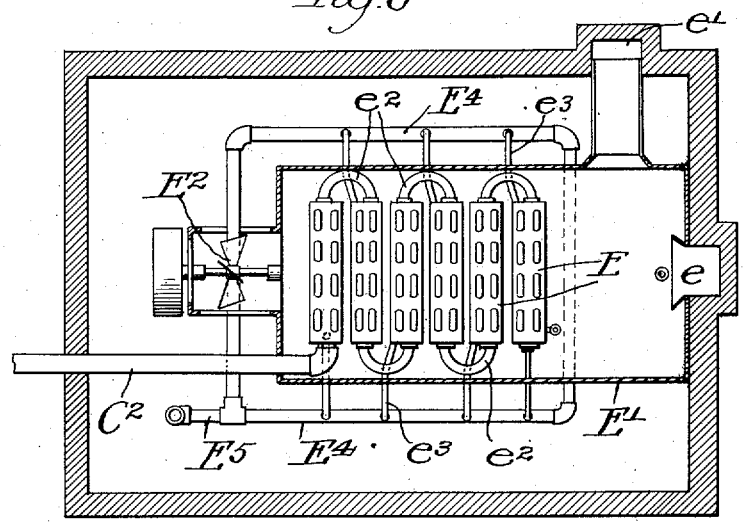
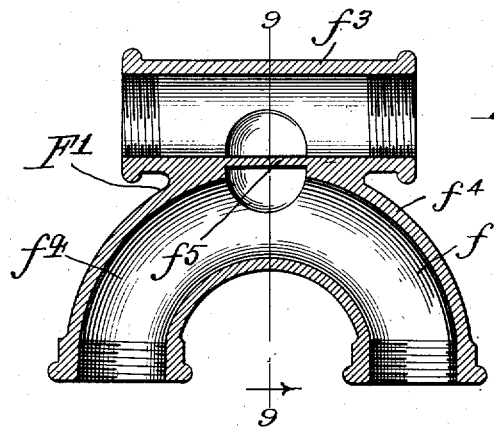
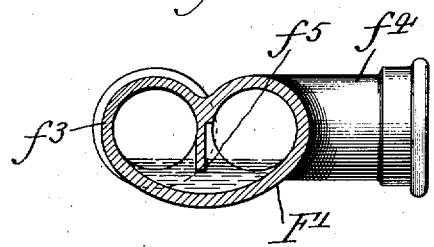
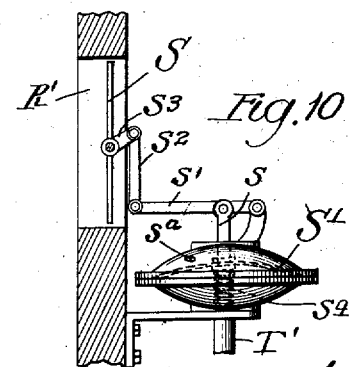

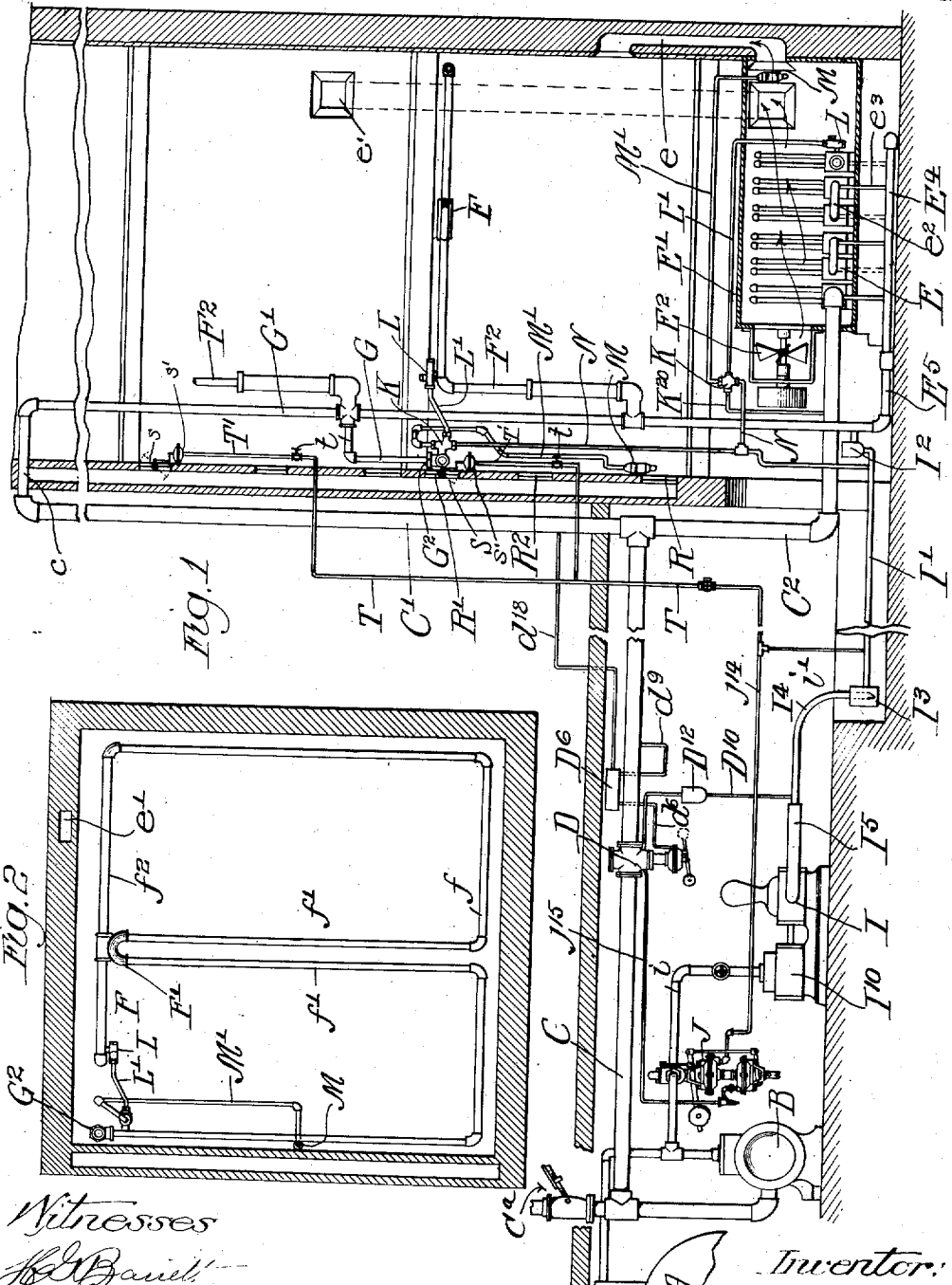

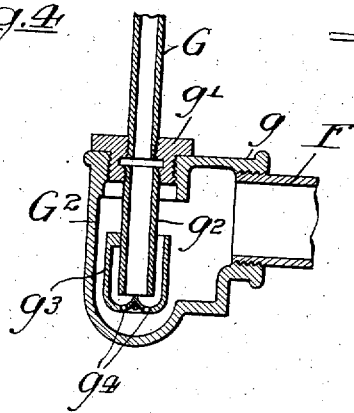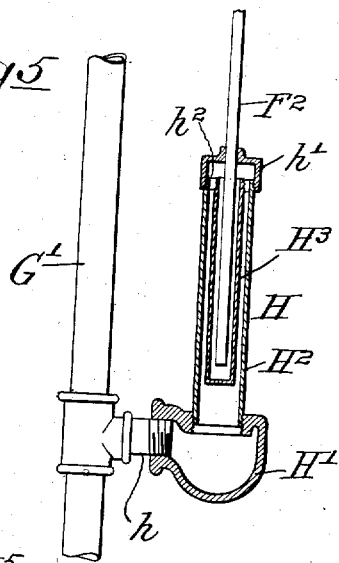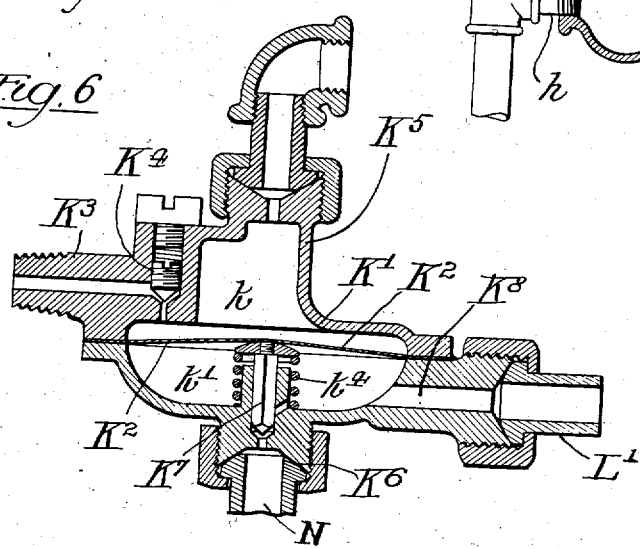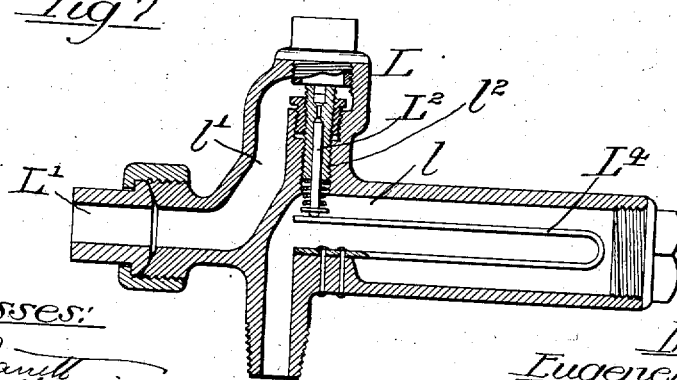

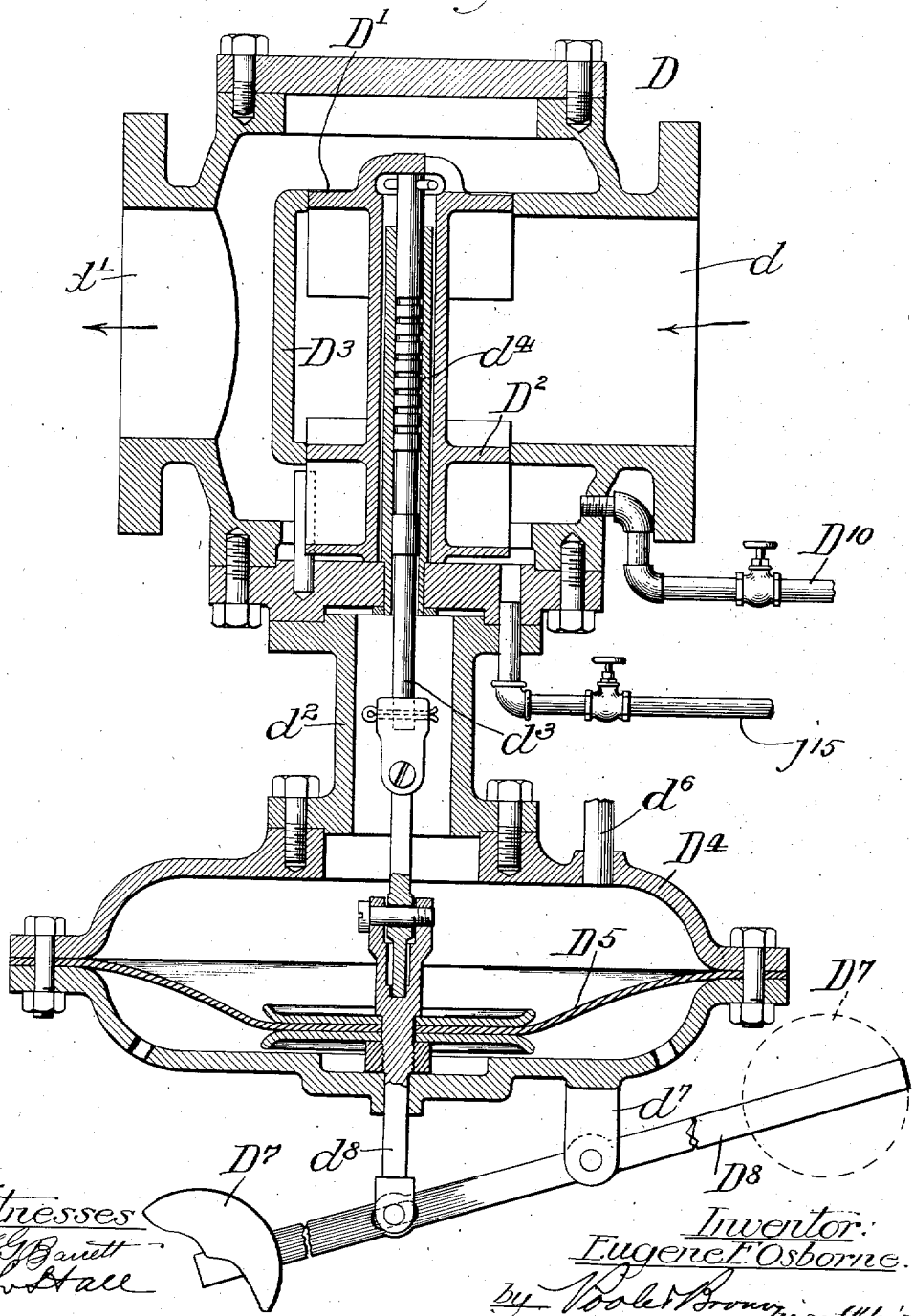

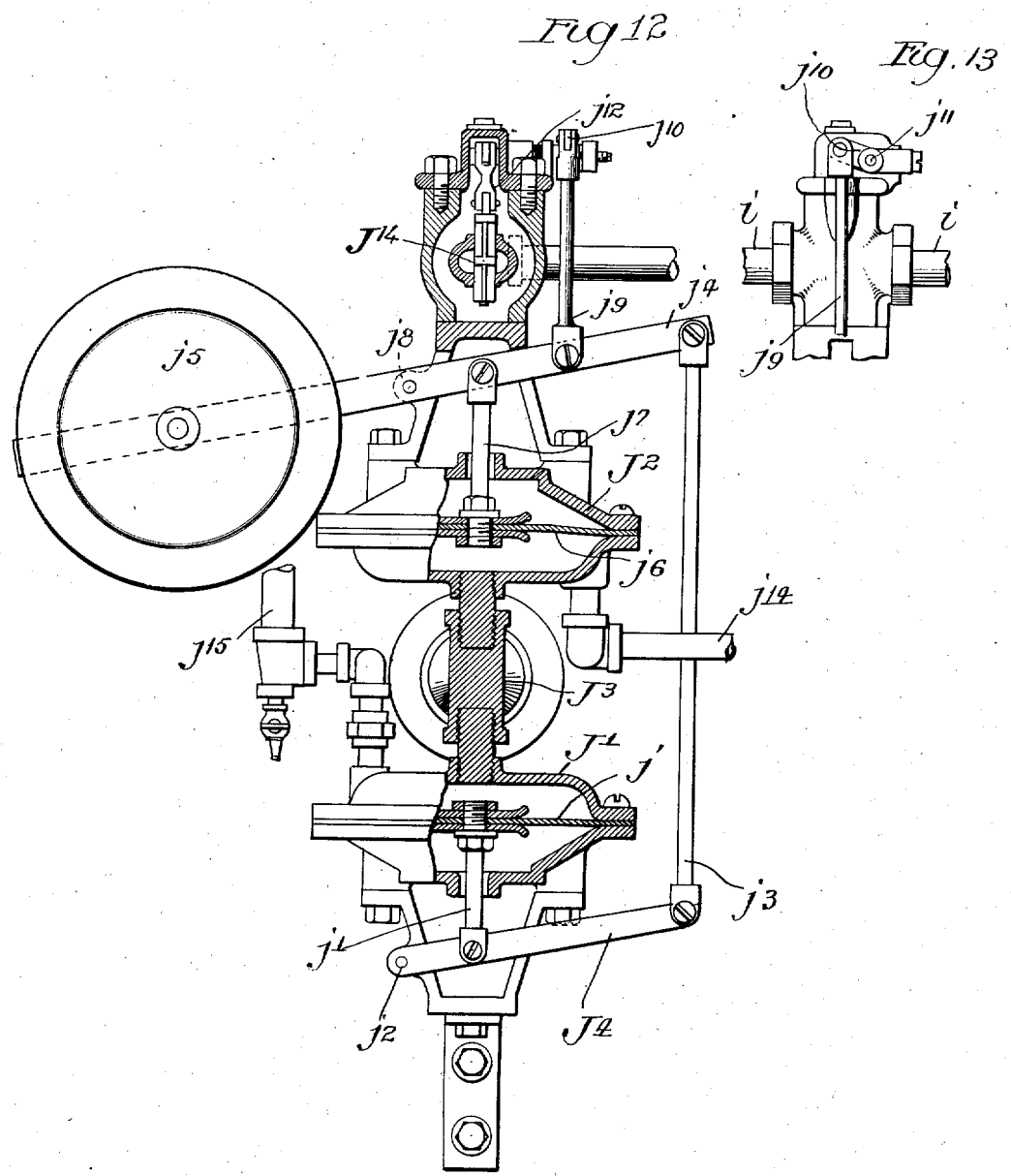

UNITED STATES PATENT OFFICE.

EUGENE F. OSBORNE, OF CHICAGO, ILLINOIS, ASSIGNOR TO OSBORNE STEAM ENGINEERING COMPANY, OF CHICAGO, ILLINOIS, A CORPORATION OF ILLINOIS.

HEATING AND VENTILATING APPARATUS.

No. 886,325.          Specification of Letters Patent.          Patented April 28, 1908.

Application filed February 23, 1904. Serial No. 194,927.

*To all whom it may concern:*

Be it known that I, EUGENE F. OSBORNE, a citizen of the United States, and a resident of Chicago, in the county of Cook and State of Illinois, have invented certain new and useful Improvements in Heating and Ventilating Apparatus; and I do hereby declare that the following is a full, clear, and exact description thereof, reference being had to the accompanying drawings, and to the letters of reference marked thereon, which form a part of this specification.

This invention relates to improvements in systems for heating and ventilating apartments and among the objects of the invention is to produce a system by which air may be introduced into an apartment and discharged therefrom in such manner as to maintain the purest and preferably the coolest air in the area of the apartment which may be termed the breathing area or level, or the space at the height of the heads of the occupants of the room.

A further object of the invention is to produce a system of this character by which the heavier gases produced by respiration will be discharged at the floor level and the lighter gases will be discharged at a level nearer the ceiling of the room, whereby there is little or no tendency, in the normal operation of the system, to mix the heavier and lighter gases with each other or with the intermediate newly introduced layer of breathing air in such manner as to vitiate breathable air.

A further object of the invention is to heat the air in the apartment in such manner as to avoid raising the heavier gases or air constituents and mixing them with the breathable air.

A further object of the invention is to provide an improved system for heating the apartment comprising the combination of indirect and direct heating means.

A further object of the invention is to provide an improved indirect heating device or apparatus by which the air is raised in temperature prior to its admission to the apartment and constructed to increase the efficiency of the same.

A further object of the invention is to provide an improved means for automatically controlling the heat of the apparatus.

The system herein shown as embodying my invention embraces, in general terms, an indirect heating device over which air is passed on its way to the apartment to be heated and ventilated, a direct radiating device located in the apartment at or near the ceiling level thereof, means for discharging the air from the apartment at different levels, depending upon the densities of the different layers of air constituents, whereby the layers of different densities do not become intermingled, and means for controllably varying the temperature of the air in the apartment. The heating is accomplished preferably by steam and the steam is herein shown as employed under "vacuum". The air, heated by its passage over the indirect heating device, enters the apartment at or near the breathing level or area. An outlet is provided at the top of the apartment through which the lighter air constituents escape from the apartment. Another outlet passage is provided near the floor level for the withdrawal of the heavier air constituents, and a third outlet is provided slightly above the breathing level for the withdrawal of the air constituent of intermediate density and to insure a circulation of the breathable air through the apartment. The volume of air admitted to the room depends upon the number of occupants thereof.

As the air is breathed by the occupants of the apartment and the exhalations thrown out into the apartment, the heavier constituent, to wit,—carbon dioxid, tends to and does fall toward the floor of the apartment and is from thence discharged through the lower air outlet, and the lighter constituents of the air, such as the aqueous vapor and nitrogen, rise toward the ceiling of the apartment and are discharged therefrom near the ceiling level, while the constituents of intermediate density pass from the apartment through the intermediate outlet. It is to be understood that normally, the windows and doors of the apartment will be closed, so that ingress and egress of air is afforded through the prescribed openings above referred to. As a result of this arrangement, the air at the breathing level is always fresh and, by reason of the relative densities of the air constituents there is but little or no tendency of the contaminated or vitiated air to become mixed in substantial quantities with the incoming fresh air before the consumption of the fresh air by the occupants of the apartment. Whatever bacteria there may be in the air will be found for the most part to be near the ceiling or in the aqueous vapor area, and such bacteria do not descend to the breathing area or level. The top area of the apartment is cleared from the lighter foul air periodically, the upper outlet being controlled by a damper or valve.

The heating of the apartment aside from that afforded by the heated air supplied to the apartment is accomplished by direct radiation from a heating device located at or near the ceiling of the apartment. As a result the heavier foul air constituents at or near the floor are not heated sufficiently to rise, and the lighter impure air is too hot to fall downwardly through the layer of fresh incoming air. In practice, the heavier air constituents are discharged from the apartment at the floor level at about the temerature of 70° while fresh air should be delivered to the apartment at a temperature of from 65° to 68°. Said fresh heated air is preferably delivered to the apartment from four to six feet above the floor level and is discharged from the apartment at from seven to ten feet above the floor level, the discharged air being raised in temperature by its passage through the apartment. The radiant heat from the heating device at the ceiling passes through the stratified air constituents but does not directly heat the same. Such radiant heat acts directly to heat the floor and also acts to heat the ceiling and the upper air stratum, and by reflection against and radiation from the ceiling to further heat the floor. The space near the ceiling is maintained considerably warmer than the floor area or space. The supply of steam to the radiating device located near the ceiling is preferably automatically regulated by a thermostat located at or near the floor and therefore regulated in accordance with the temperature of the air discharged near the floor level and the indirect heating device is also thermostatically controlled.

I have illustrated in the drawings one approved form of apparatus for carrying out my invention, in which,—

Figure 1 is a view, principally diagrammatic in its nature, showing a complete heating device for one room or apartment and a part for another, the indirect heating device, and the source of steam together with appliances for directing and regulating the steam and air. Fig. 2 is a bottom plan view of the heating device located near the ceiling of the apartment. Fig. 3 is a horizontal section of the indirect heating device by which the air is heated prior to its admission to the apartment. Fig. 4 is a feed seal fitting which is located at the induction end of the upper heating device. Fig. 5 illustrates a trap fitting for the water of condensation pipe leading from the ceiling heating device. Fig. 6 is a sectional view of a shifting valve located at the induction end of the heating device. Fig. 7 is a similar view of an air valve located at the eduction end of the heating device. Fig. 8 is a sectional view of a trapped fitting included in the ceiling heating device. Fig. 9 is a section thereof, taken on line 9—9 of Fig. 8. Fig. 10 is a detail, illustrating the manner of venting the air from the ceiling area of the apartment. Fig. 11 is a vertical section of a reducing valve located in the steam supply pipe. Fig. 12 is a view, partly in section and partly in elevation, of a differential governor for controlling the steam to the exhaust pump of the heating apparatus. Fig. 13 is a fragmentary side elevation of the upper end of said governor.

As shown in the drawings, A designates a steam boiler constituting the source of steam supply, B an engine in which the steam generated in the boiler is employed for any useful purpose, and C the exhaust pipe of said engine. D designates a pressure reducing valve located in said exhaust pipe and which acts to reduce the pressure of the exhaust steam below atmospheric pressure prior to its use in the heating devices. Said exhaust pipe is provided with an exhaust valve $C^a$ of any suitable type whereby steam not used for heating purposes may be discharged into the atmosphere. I designates a pump for withdrawing the water of condensation and air from the heating devices. The engine $I^{10}$ of said pump receives steam from the boiler A through a pipe $i$, the supply of steam being controlled by a differential regulator or governor J, hereinafter to be described. Said steam pipe C is provided with two branches $C^1$, $C^2$, one of which leads to and supplies the direct heating devices F located near the ceiling of the apartments and the other of which leads to the indirect heating device which is herein shown as located in the basement of the building. Said indirect heating device consists essentially of a plurality of radiator units E connected in series by means of short pipes $e^2$, the connection being located alternately at opposite sides of the device. The steam is delivered into the radiator at one end of the series and passes progressively through the radiators until it reaches the last of the series. The said heating device is located within an air chamber $E^1$ through which the air is forced by means of a fan $E^2$ or other suitable air forcing device, and the said air chamber is connected with the apartments of the building by means of air flues or passages $e$, $e^1$. Steam passes progressively through the radiators thus connected and in its passage assumes a backward and forward traverse across the path of the air as it passes through and over the device. One end of the base of each radiator or unit is provided with a water of condensation or drip pipe $e^3$, the drip pipes of adjacent units being located on opposite sides of the series. Said drip pipes are connected with two parallel water collecting pipes $E^4$ which are connected with a common return $E^5$ by which the water of condensation is led away from the heating device through the action of the pump I in a manner hereinafter to be described.

As herein shown the steam to the heating device is controlled by the admission of air to said heating device, the air being admitted to the feed end of the heating device and mixed with the steam and finally collecting at the rear end of the heating device as the steam condenses therein, from whence it is automatically withdrawn to permit the entrance of more steam to the heating device. This is accomplished automatically by the employment of a thermostatic regulating apparatus shown generally in Fig. 1, and certain of the details of which are indicated more clearly in Figs. 6 and 7. The manner of regulating the supply of steam to said indirect heating device is the same as that for controlling the supply of steam to the upper or ceiling radiator and the details of such apparatus will be hereinafter described, after the upper radiator has been described. Each apartment is provided with three air outlet openings, to wit,—one R, near the floor level, one $R^1$, near the ceiling level, and one $R^2$, a distance above the level of the inlet passage. The openings R, $R^2$ are designed to be open at all times, while the opening $R^1$ is designed to be only periodically opened to clear the air from the upper part of the apartment.

F designates as a whole one of the radiators for heating the apartments. Said radiator is located near the ceiling of said apartment, and consists, as herein shown, of what is in effect a single line of pipe have the general form of a rectangle which extends around the four sides of the room. One of the sides $f$ of said rectangle is provided with a loop comprising two substantially parallel members $f^1, f^1$ which are joined to the side $f^2$ opposite the side $f$ by means of a fitting $F^1$, which is shown in detail in Figs. 8 and 9. The fitting consists of a short tube $f^3$ threaded at both ends to receive the sections of the pipe $f^2$ and two branches $f^4, f^4$ communicating with the tube centrally thereof, and separated therefrom by a depending weir $f^5$. Water of condensation entering said fitting passes beneath said weir and to the outlet end of the pipe $f^2$, but, inasmuch as the bottom edge of the weir is sealed, steam is trapped from said discharge end of the pipe $f^2$ and passes throughout the heating device. The feed end of said heating device is connected by a branch G with a descending steam pipe, which latter pipe $G^1$ is connected at its upper end by means of a cross-pipe $c$ with the ascending branch $C^1$ of the main supply pipe. The pipe $G^1$ discharges water condensed therein or led thereto into the water of condensation pipe $E^5$ of the indirect heating device, as herein shown. The branch G is connected with the feed end of the radiator through the medium of a feed seal fitting $G^2$ shown in detail in Fig. 4.

The chamber of the fitting $G^2$ is provided at one side with a branch $g$ with which the feed end of the radiator F is connected and at its top with an opening which receives a bushing $g^1$, which latter is provided with a screw-threaded opening to receive said branch G, and also a depending tubular section $g^2$ which extends into the chamber of the fitting. Said tubular section is provided at its lower end with a feed bushing $g^3$, which surrounds the open end of said tubular section $g^2$. Said bushing $g^3$ is provided near its bottom with openings $g^4$. The construction of this bushing is such that it operates to prevent the back flow of steam and air into the steam pipe, while permitting the free entrance of steam from the pipe G through the fitting into the heating device.

The water of condensation is discharged from the heating device F through a water of condensation or drip pipe $F^2$ which discharges into a seal shown in detail in Fig. 5, said seal discharging into the descending steam pipe $G^1$. The chamber $H^1$ of said fitting is connected by a short branch pipe $h$ with the pipe $G^1$. $H^2$ designates a pipe which rises from said chamber $H^1$ and is provided at its upper end with a cap $h^1$ through which the drip pipe $F^2$ extends. $H^3$ designates a tube which is closed at its lower end and open at its upper to receive the lower end of the drip pipe $F^2$, the latter pipe passing nearly to the bottom of the pipe or tube $H^3$. The construction of said seal is such that it may, while retaining a conveniently short length, provide an ample depth or length of seal between the high and low pressure sides of the heating system.

The connection between the heating devices and the pump I are made as follows: $I^1$ designates a pipe connected with the lower end of the descending pipe $G^1$, and said pipe $I^1$ is provided with a trap $I^2$. The pipe $I^1$ discharges at its end remote from the trap $I^2$ into a cup-shaped receptacle $I^3$. $I^4$ designates a continuation of the pipe $I^1$ which is located above the level of the latter pipe and is connected by a downwardly turned part $i^1$ with said cup $I^3$, said downwardly turned part dipping into said cup below the level of the section $I^1$. Said pipe $I^4$ is enlarged, as shown at $I^5$, the enlarged part of said pipe communicating with the cylinder of the pump I. The pipe $I^4$ should be made about half the diameter of the pipe $I^5$, while the enlarged section $I^5$ should be made somewhat more than twice the diameter of the pipe $I^1$. Owing to the relative sizes of the pipes $I^4$ and $I^1$ and to the fact that the down-turned end of the pipe $I^4$ dips into the cup $I^3$ in the manner shown, which cup is made but little larger than the pipe I⁴, the mixture of water and air is lifted through the pipe I⁴ in the form of alternate bodies or slugs, with the result that the water is lifted to the pump with less difference in gage pressure between the pipe I¹ and the upper end of the pipe I⁴ than if water in a solid stream be lifted. That is to say, water is drawn through the pipe I⁴ in the normal speed of the pump at a slightly greater rate than it is delivered into said cup I³, so that the receiving end of the pipe I⁴ is periodically uncovered, and when so uncovered draws air. The water flows steadily into the cup so that during the short interruption of the passage of the water into the pipe I⁴ it continues to collect in the cup or receptacle I³, and thus the mixture of air and water is alternately lifted in slugs through the pipe I⁴. The enlargement I⁶ of the pipe I⁴ at the pump cylinder provides a storage reservoir from which the pump cylinder is supplied, thus furnishing a steady body of water to the pump.

Water collecting in the reducing valve D is herein shown as dripping into the pipe I⁴ through the medium of a drip pipe D¹⁰, provided with a trap D¹² to prevent the equalization of pressures on the high and low pressure sides of the system through said drip pipe.

Referring now to the automatic mechanism for withdrawing air from the heating devices and thereby regulating the supply of steam thereto and for delivering said air to the return pipe I¹, such mechanism is made as follows:—

K, K designate what may be termed shifting valves, shown in detail in Fig. 6, and connected with the feed ends of the heating devices E and F, and also connected, through automatic air valves L (Fig. 7) with the sides of said heating devices remote from the feed ends thereof, and also with thermostats M. The shifting valve K consists of a casing K¹ provided with an interior diaphragm K² dividing the casing into two chambers k, k¹.

K³ designates a tubular branch connecting the chamber k with the heating device. The connection with the heating device E consists of a pipe K²⁰ which leads to the steam supply branch C² thereof. Said tubular branch K³ is adapted to be more or less restricted by means of a throttle valve K⁴ of any desired construction. A second passage K⁵ leads from said chamber k and is adapted to be connected by means of a pipe M¹ with the thermostat M. The thermostat herein shown is like that illustrated in my United States Letters Patent, No. 795,856, dated August 1, 1905. The thermostats of the ceiling heating devices are herein shown as located adjacent to the lower outlet openings R, while that for the indirect heating device is located at the base of one of the air passages e, e¹, or at the rear end of the said heating device.

The other chamber k¹ of said shifting valve is connected by means of a hollow branch K⁶ thereof and a pipe N with the water and air return pipe I¹ and is therefore the low pressure or vacuum side of the valve. Said passage K⁶ is provided with a valve consisting of an endwise movable valve plug K⁷ which is provided with a conical end which seats against a conical seat in the passage. Said valve plug K⁷ is provided at its upper end with a head which bears against or is attached to the diaphragm K², and a spring k⁴ is interposed between the casing and the head of said valve stem, which normally holds the valve away from its seat. The spring surrounds an upstanding guide flange for said stem. Said chamber k¹ is also connected by means of a hollow branch K⁸ and a pipe L¹ with the air valve L, which latter is connected with the exhaust side of the radiator or that remote from the steam feed side. Said air valve L, (Fig. 7), comprises a casing provided with induction and eduction chambers l, l¹, respectively, the latter of which communicates with the pipe L¹, and the former of which communicates with the discharge end of the radiator. A thermostatically controlled valve is located between said induction and eduction chambers of the casing consisting of an endwise movable, spring pressed valve plug L² which engages a seat in a hollow sleeve or bushing l². The chamber l is elongated to receive a thermostatic member L⁴ which, as herein shown, consists of a strip of thermostatic material bent upon itself, one end of which is attached to the casing and the other end of which bears against the valve plug L². When said thermostatic member L⁴ is heated, it acts to raise the free end thereof towards the valve stem and to close the valve, and when said thermostatic member is cooled the valve is allowed to open under the influence of its actuating spring.

The operation of this part of the apparatus is substantially as follows:—The thermostat M is adjusted to open to permit air at atmospheric pressure, to enter therethrough to the shifting valve and heating device at a selected temperature, say, for instance, at 70° above zero F. If it be assumed that the temperature surrounding the thermostat is above such selected temperature, said thermostat opens and permits air to pass through the shifting valve into the feed end of the radiator, the air thus admitted acting as a displacing agent when the steam is condensed therefrom; said air collecting at the end of the heating device remote from the steam inlet thereof. During the time said thermostat is open and air is passing through the shifting valve into the heating device in the manner stated, the pressure of the air acts on the diaphragm K² to hold the valve K⁷ against its seat and therefore the passage K⁶ closed. As soon, however, as the thermostat is closed, which occurs when the air about the same cools, and the air pressure is relieved on the diaphragm $K^2$, the spring $k^4$ acts to open the valve $K^7$ thereby establishing communication between the vacuum pipe N, and the air valve through the shifting valve. If the air valve be open at this time, said vacuum acts to withdraw the air from the heating device, thereby permitting more steam to enter the heating device, and such withdrawal of the air continues until all of the air is withdrawn therefrom and steam impinges against the thermostatic member of the air valve, whereupon said air valve is closed and no further steam or air withdrawn therefrom. If the air valve is closed at the time communication is established between the vacuum pipe N and the air valve, the opening of the valve $K^7$ will produce no effect until said valve air is opened. It is thus seen that the heating effect of the heating devices is controlled by the temperature of the air surrounding the thermostat.

The pressure reducing valve D (Fig. 11) is generally like that shown in my prior United States Letters Patent, No. 795,856, dated August 1st, 1905. It comprises, in general terms, a casing having an inlet passage $d$ and an outlet passage $d^1$, connected with the section of the pipe C.

$D^1$, $D^2$ designate upper and lower connected valves coöperating with upper and lower alined openings formed in an inner casing $D^3$ extending inwardly from the induction passage $d$.

$D^4$ is a diaphragm chamber connected by a neck $d^2$ with the main valve casing and containing a diaphragm which is connected by a stem $d^3$ with the connected valves $D^1$, $D^2$. The stem extends upwardly through a tube $d^4$ located within the part connecting the valves $D^1$, $D^2$ and the stem is circumferentially grooved, the parts of which constitute, when the stem is surrounded by water, a stuffing box or liquid packing to cut off communication between the valve casing and diaphragm chamber. The upper part of the diaphragm chamber above the diaphragm communicates with a water tank $D^6$ through a pipe $d^6$ and the liquid head thus furnished acts on the diaphragm in a manner to hold the valve closed. Such closing action of the liquid head is supplemented by a weight $D^7$ slidably mounted on a lever $D^8$ which is pivoted to a lug $d^7$ depending from the diaphragm chamber and is loosely connected with a stem $d^8$ depending from the diaphragm. The tank $D^6$ is connected by a pipe $d^{18}$ with the side of the steam supply pipe beyond said valve, (with the branch $C^1$ as herein shown), the pipe $d^{18}$ entering the upper side of said tank. The tank $D^6$ is, therefore, subject to the vacuum of the pipe $C^1$. The surplus water is drained from said tank $D^6$ through a pipe $d^9$ into the pipe C.

If it be assumed that the system is out of action and the tank $D^6$ filled and the system is to be started into operation, the pump I will be first started to withdraw the air from the system and thereby produce a vacuum in the system beyond the valve D. The vacuum is increased until the liquid head and weight $D^7$, acting on the diaphragm, is overcome, whereupon the atmospheric pressure acts to open the reducing valve and admit steam at the desired vacuum into the heating system; and the degree of vacuum at which steam is admitted to the heating system may be governed by the position of the slidable weight $D^7$ on the lever $D^8$. Said weight is removable and may be attached to either end of the lever, as indicated in dotted lines in Fig. 11. When the weight is attached to the end of the lever indicated in dotted lines it acts against the liquid head. The drain pipe $D^{10}$ leads from the valve chamber a distance above the floor of the valve chamber so as to maintain a body of water in the valve for a purpose hereinafter to be set forth.

The differential governor or regulator J comprises two diaphragm chambers $J^1$, $J^2$ connected by a part $J^3$. The lower diaphragm chamber contains a diaphragm $j$ to which is centrally attached a stem $j^1$ which extends downwardly through an opening in the bottom wall of the chamber. Said stem $j^1$ is connected at its lower end with a vertically swinging lever $j^4$ which is pivoted at one end to a stud $j^2$ at the lower end of the device and is loosely connected at its other end with a vertically reciprocating rod $j^3$. Said rod is loosely connected at its upper end with one end of a lever $j^4$ which is pivoted to a stud $j^8$ and is provided at its end remote from its connection with the rod $j^3$ with a weight $j^5$. The upper diaphragm chamber is provided with a diaphragm $j^6$ to which is centrally attached a stem $j^7$ which extends upwardly through the upper wall of the diaphragm chamber and is connected with the weighted lever $j^4$ on the side of its pivot $j^8$ remote from the weight. Loosely connected with the weighted lever between said stem $j^7$ and the rod $j^3$ is an endwise reciprocating rod $j^9$ which is pivoted at its upper end to a crank $j^{10}$ of a rock-shaft $j^{11}$, which latter is connected by a link $j^{12}$ with the valve $J^{14}$ which controls the passage of steam through the pipe $i$. The lower side of the upper diaphragm chamber is connected with the return or low pressure side of the system by means of a pipe $j^{14}$, while the upper side of the lower diaphragm chamber is connected with the feed side or high pressure side of the system by means of a pipe $j^{15}$, the connection being through the reducing valve D. As will be observed by reference to Fig. 11 the receiving end of the pipe $j^{15}$ communicates with the chamber of the reducing valve below the outlet or drain pipe $D^{10}$ so that there is always a body of water in the casing for keeping filled the pipe $j^{15}$ and thereby maintaining a given hydrostatic head on the lower diaphragm. Before the system has been started in operation the weighted lever $j^4$ assumes the position shown in Figs. 1 and 12 with the weight hanging downwardly, and with the diaphragms $j, j^6$ in their upper positions. In these positions of the parts the steam valve $J^{14}$ is open and steam is free to enter the pump engine. As soon as steam is admitted to the reducing valve, the pump engine is started, the valve $J^{14}$ being opened at this time. Upon the continued operation of the pump a vacuum is induced on the return side of the system which acts to draw downwardly the upper diaphragm and close the valve $J^{14}$ and such closing movement of the valve is supplemented by the hydrostatic head acting on the lower diaphragm. The hydrostatic head will, however, be diminished to the extent of the vacuum on the feed side of the system. The weight acts against the closing movement of the valve and serves to maintain a uniform difference in pressures regardless of the absolute pressures.

The operation of the apparatus is as follows:—When the building is to be heated, steam is admitted to the lower indirect heating device and also to the upper heating devices located near the ceiling of the room through the branch pipes $C^1$, $C^2$. The air forcing device or fan $E^2$ is set in motion to force air over the heated coils of the indirect heating device and said air is admitted to the apartments through the passages $e, e^1$. The lower outlet opening R of the apartment, and the intermediate outlet opening $R^2$, are continuously open to a desired extent so that air is free to pass therefrom. The air enters the apartment at the breathing level and is partially consumed by respiration of the occupants of the apartment. The air exhaled from the lungs of the occupants of the apartment is thrown out at the breathing level and the heavier constituents of the air fall towards the floor, while the lighter constituents rise toward the ceiling. Said heavier constituents of the air are discharged from the apartment through the lower discharge passage R. The lightest constituents of the air rise to ceiling while those of intermediate density pass from the apartment through the intermediate outlet opening $R^2$. The upper outlet opening $R^1$ is closed by a damper or valve S which is periodically opened to clear the upper space of the apartment. The damper S is opened and closed by a diaphragm located in a chamber $S^1$ (Fig. 10) and communicating at its lower side with the low pressure side of the system through a pipe T. The pipe has branches $T^1$ which enter the lower sides of the diaphragm chambers $S^1$ and the branches are provided at points accessible from the floor of the room with valves $t$. The stems $s$ of the diaphragms are attached to levers $s^1$ pivoted at their outer ends to lugs rising from the diaphragm chambers and loosely connected at their opposite ends with links $s^2$ which are pivoted to cranks $s^3$ which are attached to the pivoted dampers S. With this construction, when the valves $t$ are opened, the vacuum acts to draw the diaphragm downwardly and through the connection described to open the damper S. When the valves $t$ are closed the dampers are closed by springs $s^4$ (indicated in dotted lines in Fig. 10) which press upwardly against the diaphragms and act in opposition to the vacuum by which the dampers are opened. The upper wall of the diaphragm chamber is provided with one or more openings $s^a$ to permit the diaphragm to be depressed when the lower side of the diaphragm chamber is in communication with the low pressure side of the systems.

The heat of the upper heating devices F heats by radiation the floor and maintains the same properly heated, and the supply of steam thereto is regulated by the thermostats M which are located near the floor air outlets. The apartment at the breathing level is maintained at approximately the temperature of the air which is introduced into the room, to wit,—in the neighborhood of 65° to 68° F. above zero and the temperature of the warmer fouler air at the floor is maintained in the neighborhood of 70° F. above zero, while the temperature of the air at the ceiling is maintained much higher. The heavier air constituents near the floor do not rise as they are not heated sufficiently, but are heated sufficiently for the comfort of the occupants of the apartment. The air near the ceiling does not fall to a lower area of the room as it cannot fall through the denser intermediate layers. It will be observed that the location of the intermediate outlet $R^2$ above the air inlets maintains a circulation of the newly introduced air and that the air passes into the apartment and is consumed by respiration of the occupants or passes out of the apartment before it becomes substantially heated, inasmuch as the radiant heat passing therethrough does not directly heat it. In this manner, therefore, I am enabled to furnish a sufficient heat for the comfort of the occupants of the apartment and at the same time provide healthful breathing air which is not vitiated by the commingling therewith of the heavier foul air, which would occur if the heating devices be located near the floor, and said foul air sufficiently heated to cause it to rise to the top of the room.

The arrangement of the indirect heating device, whereby the steam passes a number of times across the path of the air which is forced over said device, is of considerable importance as it permits the restriction or regulation of said heating device by the cooling of certain of its coils, and at the same time avoids the cooling of the coils in a manner to prevent all of the air forced thereover being uniformly heated.

I claim as my invention:—

1. In an apparatus for heating and ventilating apartments, means for introducing heated air into the apartment at or near the breathing level, a plurality of outlet passages, one located near the floor and the other above the breathing level, and means for heating said apartment by direct radiation so arranged that the heavier air constituents do not rise but are discharged near the floor and the lighter air constituents near the ceiling are kept so warm that they do not fall to the breathing level whereby the newly introduced air is maintained substantially free from the vitiated air.

2. In an apparatus for heating and ventilating apartments, means for introducing heated air into the apartment at or near the breathing level, a heating device located near the ceiling of the apartment and a plurality of outlet openings for the apartment, one located near the floor thereof and another above the breathing level.

3. In an apparatus for heating and ventilating apartments, means for introducing heated air into the apartment at or near the breathing level, a heating device located near the ceiling of the apartment, and a plurality of outlet openings for the apartment, one located near the floor thereof, one located near the ceiling and another intermediate the same above the breathing level.

4. In an apparatus for heating and ventilating apartments, means for introducing heated air into the apartment at or near the breathing level, a heating device located near the ceiling of the apartment, a plurality of outlet openings for the apartment, one located near the floor thereof, one located near the ceiling and another intermediate the same above the breathing level, a damper in the upper outlet opening and means for opening and closing said damper.

5. In an apparatus for heating and ventilating apartments, means for introducing heated air into the apartment at or near the breathing level, a steam heating device located near the ceiling, a plurality of outlet openings for said apartment, one located near the floor thereof and another located above the breathing line, and a thermostat located near the floor for controlling the supply of steam to the heating device.

6. In an apparatus for heating and ventilating apartments, a heating device located near the ceiling of the apartment, an inlet passage which opens into the apartment at or near the breathing level, a plurality of outlet openings in the wall of the apartment, one located near the floor thereof and another above the breathing level, an air passage for supplying air to the inlet passage of the room, a heating device in said air passage and means for forcing air over said heating device through the passage into the apartment.

7. In apparatus for heating and ventilating apartments a heating device located near the ceiling of the apartment, an inlet passage which opens into the apartment at or near the breathing level, a plurality of outlet passages, one located near the floor of the apartment and another at or about the breathing level thereof, and an indirect heating device comprising a passage connected with said inlet passage, means for forcing air through said passage, and a heating apparatus located in said passage comprising a plurality of radiator bases located in said passage and connected at alternate ends with each other in series, and vertical pipes or coils rising from and communicating with each of said bases, whereby the heating fluid passes progressively from one radiator to the others in a to and fro path across the path of the air on its way to the apartment and means for releasing the air from the apartment.

In testimony, that I claim the foregoing as my invention I affix my signature in presence of two witnesses, this 20th day of February, A. D. 1904.

EUGENE F. OSBORNE.

Witnesses:
　WILLIAM L. HALL,
　GERTRUDE BRYCE.